(12) United States Patent
Knirck

(10) Patent No.: US 9,052,511 B1
(45) Date of Patent: Jun. 9, 2015

(54) METHOD AND APPARATUS FOR RESONANT ROTATIONAL OSCILLATOR

(76) Inventor: Jeffrey Knirck, Sunnyvale, CA (US)

(\*) Notice: Subject to any disclaimer, the term of this patent is extended or adjusted under 35 U.S.C. 154(b) by 273 days.

(21) Appl. No.: 13/571,883

(22) Filed: Aug. 10, 2012

(51) Int. Cl.
*G02B 26/08* (2006.01)
*G02B 26/10* (2006.01)

(52) U.S. Cl.
CPC .......... *G02B 26/0841* (2013.01); *G02B 26/105* (2013.01)

(58) Field of Classification Search
None
See application file for complete search history.

(56) References Cited

U.S. PATENT DOCUMENTS

| | | |
|---|---|---|
| 3,150,337 A | 9/1964 | Allison |
| 3,532,408 A | 10/1970 | Dostal |
| 3,609,485 A | 9/1971 | Dostal |
| 3,642,344 A | 2/1972 | Corker |
| 4,632,501 A | 12/1986 | Glynn |
| 4,732,440 A | 3/1988 | Gadhok |
| 4,919,500 A | 4/1990 | Paulsen |
| 5,521,740 A | 5/1996 | Brosens |
| 5,528,411 A | 6/1996 | Burdenko |
| 7,697,180 B2 * | 4/2010 | Nakajima .................. 359/199.1 |

\* cited by examiner

*Primary Examiner* — Jennifer L. Doak
(74) *Attorney, Agent, or Firm* — Heimlich Law, PC; Alan Heimlich, Esq.

(57) ABSTRACT

A method and apparatus for resonant rotational oscillator have been disclosed. In one version a moving coil is mounted on a rotating member. By using a magnetic assembly and the moving coil the rotating member is made to rotate.

6 Claims, 8 Drawing Sheets

METHOD AND APPARATUS FOR RESONANT ROTATIONAL OSCILLATOR

FIELD OF THE INVENTION

The present invention pertains to rotational oscillators. More particularly, the present invention relates to a method and apparatus for resonant rotational oscillator.

BACKGROUND OF THE INVENTION

Resonant rotational oscillators are used, generally, to deflect, for example, a laser beam during scanning. For example, a resonant rotational oscillator might be used in a checkout stand at a store as part of the scanner for identifying product purchased, for example, by scanning for a bar code. A slow scanner or one with a limited deflection angle may slow the scanning process or make it more difficult to scan. This presents a problem.

A slow scanner, slower operation, and difficulty in scanning are likely to lead to more expensive operation. This presents a technical problem for which a technical solution is needed.

BRIEF DESCRIPTION OF THE DRAWINGS

The invention is illustrated by way of example and not limitation in the figures of the accompanying drawings.

DETAILED DESCRIPTION

Figure 1:
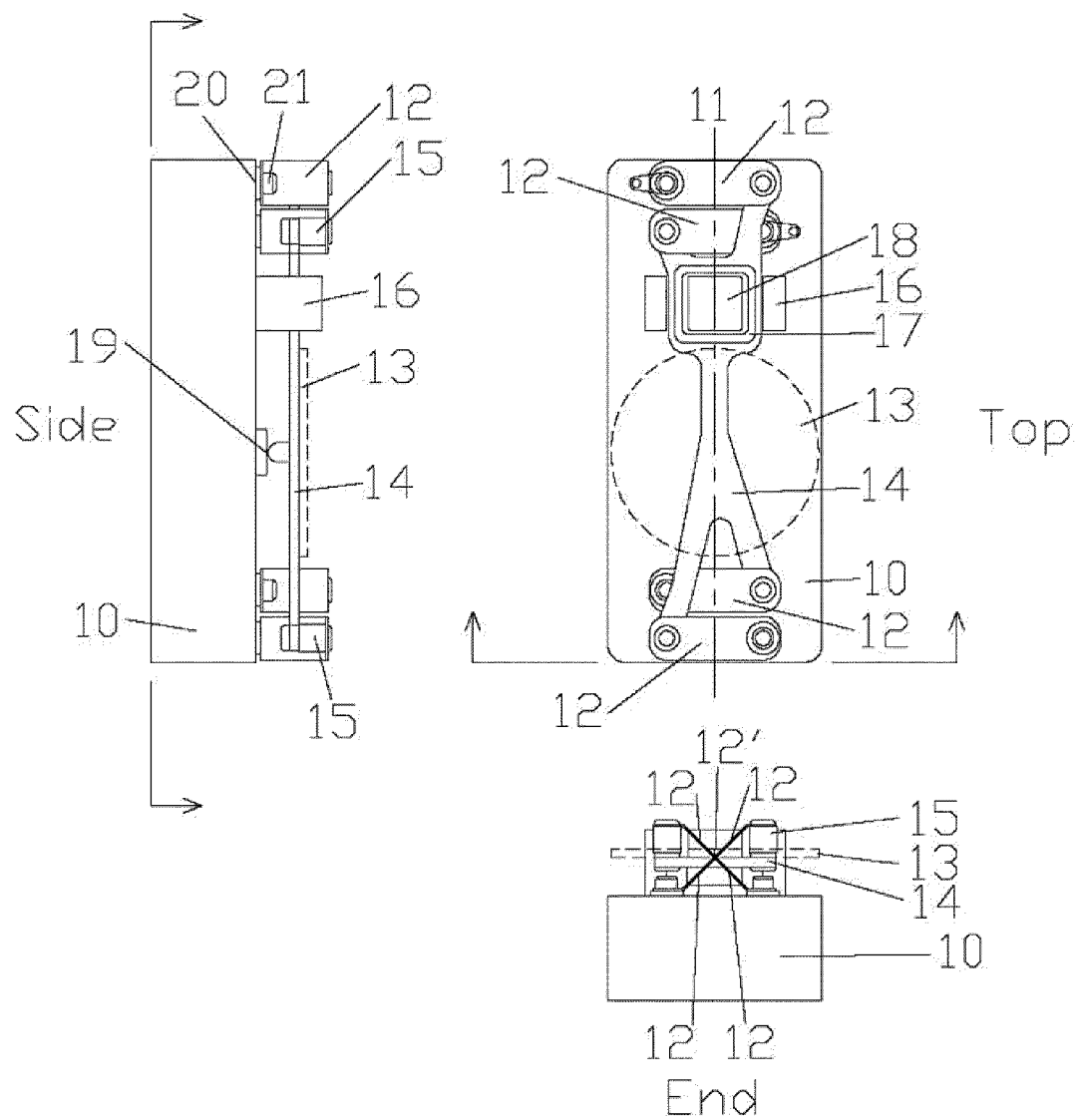
FIG. 1 illustrates one embodiment of the invention showing an End, Side, and Top view.

A method and apparatus for resonant rotational oscillator is disclosed.

In one embodiment of the invention, a rotational mechanical oscillator simultaneously achieves high resonant frequency and large angular oscillation amplitude (also denoted angular displacement or angular rotation).

In one embodiment of the invention, the device may be used with an attached mirror to optically direct or scan a light beam or optical image. Sometimes these embodiments are referred to as optical scanners or resonant scanners.

In one embodiment of the invention, the optical resonant scanner has a mirror attached to a spring that is constrained to rotate about an axis, and a motor means to drive the oscillation. The inherent rotational spring-mass system creates a mechanical resonant situation allowing the attached mirror to rotate. A light beam reflecting off the mirror executes a rotational resonant scanning motion. Various sizes and shapes of mirrors may be used as needed for a particular optical application (e.g. round, oval, rectangular, square, octagonal, hexagonal, arbitrary shape). The associated mass of the assembly is generally the primary determinant of the resonant frequency. Various architectures of motors may also be used. The motor is used to create sufficient torque to drive the resonance to the desired amplitude. The mass of the motor may become an issue as a large motor may contain excessive mass to further limit the resonant frequency. The spring in the system generally takes one of two forms. The first is a torsion bar and the second is a system of crossed flat springs.

In one embodiment of the invention, a torsion bar scanner design uses a thin rod which acts as a rotational spring when forced to twist about its longitudinal axis. In one embodiment of the invention one end of a torsion bar is fixed while a mirror is attached at the other end. In one embodiment the torsion rod is clamped at both ends and the mirror centrally located on the free length of the torsion rod. In one embodiment of the invention, tensile loading of the torsion rod is used to increase the cross-axis vibrational resonant frequency.

In one embodiment of the invention, a crossed flat spring (or crossed flexure) scanner architecture is used. In one embodiment of the invention, the crossed flexure scanner architecture uses a system of flat spring elements with a pair of adjacent flat springs mounted to form an "X". Frequently two such pairs are used, with the two pairs separated to increase cross-axis stiffness, and the primary mass (generally the mirror) suspended between the pairs. The rotational axis is at the line formed by the apparent crossing of the two springs (i.e. middle of the "X"). This embodiment of the present invention has very good cross-axis stiffness.

In one embodiment of the invention, the crossed flexures construction used consists of pairs of crossed flat spring elements clamped at one end to a rigid base and clamped at the other end to a mechanism to hold a mirror, forming an assembly that is free to rotate. In one embodiment of the invention, the moving mass is located at or near the rotational axis.

In one embodiment of the invention, to achieve indefinite spring life (with respect to the application) at large deflection angles, the ratio of spring length and spring thickness is determined by the endurance limit stress allowed in the spring material. A longer length, or thinner thickness, of a given spring material will have a lower stress for a given deflection. Countering the lowered stress of a longer spring is the higher moment of inertia of the oscillating member. This moment of inertia is very important since an increase in moment of inertia reduces the resonant frequency, for a given spring stiffness, and thus reduces the performance of the scanner.

In one embodiment of the invention, an optimized design of the crossed flexure scanner architecture minimizing the total moment of inertia of the rotating system is used thereby maximizing performance. An appropriate metric of performance is the product of frequency and maximum deflection angle. This metric of performance is referred to as performance metric denoted PM and is calculated by this equation:

$$PM = frequency * angle \qquad \text{Equation 1}$$

where:
frequency=hertz of operation of the resonant rotational oscillator; and
angle=degrees of angle deflection (maximum) of the moving member when operating at the frequency.

In one embodiment of the invention, the design and fabrication of a high performance crossed flexure resonant scanner uses an optimized design of the crossed flexure scanner architecture minimizing the total moment of inertia of the rotating system, thereby maximizing the performance metric of the product of frequency and maximum deflection angle (see Equation 1). The resultant device is capable of much higher frequencies at a given maximum angle or much larger angles at a given frequency than previous designs. The design is more manufacturable and reliable because of careful attention to the optimization process as is described.

In one embodiment of the invention a PM of greater than 12500 HzDegrees is achieved.

In one embodiment of the invention, described herein are design techniques for an optimized crossed flexure scanner architecture minimizing the total moment of inertia of the rotating system.

In one embodiment of the invention, to optimize the scanner system performance metric stress in the flexures, due to bending, limits the maximum deflection angle and is taken into account. That stress, for a given bend angle, is proportional to the square of the flexure thickness and inversely proportional to the square of the flexure length. The stiffness of a flexure is linearly proportional to the flexure (beam) width (W), proportional to the cube of the flexure thickness, and inversely proportional to the cube of the flexure length. The resonant frequency of a spring-mass system (using the linear system terminology rather that the rotational system terminology) is proportional to the square root of the ratio of the spring stiffness (k) to the moving mass (m), $f=\sqrt{(k/m)}$. The mass moment of inertia (I) (or just moment of inertia) is the sum of the product of masses (m) of all mass elements and their respective radius (r) from the rotational axis squared, $I=\Sigma mr^2$. So, to maximize the Performance Metric (PM), which is the product of frequency and maximum angle, we minimize mass and maximize the ratio of flexure length (L) and flexure thickness (t), thus PM is proportional to $\sqrt{(WL/tl)}$.

In one embodiment of the invention, the total mass is generally the sum of the mirror, or similar moving mass, which is fixed for a given optical application, and the other "unintended masses". The mirror support is considered an unintended mass, as are the moving parts of a motor and any supports required to couple the flexures and the mirror mount. The flexure to mirror mount couplings are generally at the far end of the length of the flexures so their contribution to diminishing PM is proportional to $mL^{1.5}$. Due to this effect, L is kept to a modest length so that the moment of inertia of the combined flexure to mirror mount couplings is small compared to the mirror. The other effect to minimize is due to the mirror mount. The mass of the mirror mount increases linearly with the width of the mirror plus the width of the flexures plus the width of a motor, any sensors, etc. Additionally with increased flexure width the stiffness of the flexure increases linearly, so, the flexure widths are also to be kept relatively small relative to the diameter of the mirror. Additionally, the total arm length (end to end of moving element) should be kept to a minimum to minimize resonance problems from the arm itself.

In one embodiment of the invention, therefore, the optimum design rules for a high Performance Metric resonant scanner, with an architecture as shown in FIG. 1, are as follows, normalized assuming all materials except the steel flexures have a similar mass density. Importantly, keep all masses small compared to the mirror and locate them as close to the rotational axis as possible. To keep the arm moment of inertia small, make the primary width of the arm≤mirror diameter/4, and make the width of each flexure approximately equal to ½ of the length of each flexure. Each flexure should have a flexing length, excluding the clamped ends, approximately equal to ½ of the mirror diameter. The crossed flexures should cross each other at their centers and at an angle of 90°. Finally, a flexure thickness is chosen that, in conjunction with the total moment of inertia, which will primarily be from the mirror, and produces the desired resonant frequency. This minimizes the moment of inertia.

These are generalized rules that can guide the designer to optimize a scanner design for other special cases and applications.

In one embodiment of the invention, shown generally FIG. 1, shows three orthogonal views of an embodiment of the present invention labeled End, Top and Side. All views clearly show a Base 10 which is important as a rigid and massive foundation for the reaction forces and torques created by resonant oscillation. The Top view shows the Rotational Axis 11 formed by the four Crossed Flexures 12. The crossing can be clearly seen in the End view where the flexures appear to cross at 12'. Oscillating Mirror 13 is shown as dashed lines in each view to clarify and differentiate from the scanner mechanics. The Mirror 13 is attached to Mounting Arm 14 which supports and couples the mirror to the crossed flexure system. The mirror, or other application load, in a resonant scanner is the element that must rotate. That is the whole point of the scanner.

In one embodiment of the invention, ideally, the mirror is the largest single moving mass element in the system. The mass and moment of inertia of all other parts are to be minimized compared to the mirror in order to maximize performance. The mass moment of inertia (I) (or just moment of inertia) is the sum of the product of masses (m) of all mass elements and their respective radius (r) from the rotational axis squared, $I=\Sigma mr^2$. Notice in the end view of FIG. 1 that the center of the mirror is very close to the rotational axis 11. By design, the rotational axis is placed at the location where the moment of inertia is the minimum. If all other masses are minimized then that position is also very close to the center of the mirror. Notice also, in the end view of FIG. 1 that the flexures cross at 90°. That puts the Flexure Spacers 15, which couple and separates the Flexures 12 and the Mounting Arm 14, at the smallest possible radius from the rotational axis for a given flexure length, thereby minimizing their moment of inertia contribution. The 90° crossing also maximizes cross-axis stiffness. Although, a different angle could be an appropriate trade-off with moment of inertia for a specific application.

In one embodiment of the invention, this optimization also minimizes the effect of a change in temperature causing expansion of the flexures thereby causing a shift in the resonant frequency. Any temperature change from the design point will cause the flexures to change strength, stiffness and physical dimensions, particularly length, according to the bulk properties of the flexure material. All such changes will change the resonant frequency of the scanner. However, if as described above, the center of mass is at the rotational axis, which is at the center crossing point of the flexures, then the mass center won't move with a temperature change, which would have caused a large decrease in resonant frequency.

In one embodiment of the invention, the construction technique for the present invention, the Mounting Arm 14 is a major component. Ideally, it should be both stiff and low mass. A high specific stiffness material is a good choice but geometry is also extremely important. A less stiff material made thicker is stiffer than a stiffer material made thinner, by the cube of the thickness. Epoxy-fiber glass printed circuit board (PCB) material, like FR4, is an excellent choice, especially considering its low material and fabrication costs. Additionally, conductive traces can be printed (or etched) on it to aid such tasks as routing conductors for a motor or position sensor. This provides high manufacturability and reliability while being very cost effective.

In one embodiment of the invention, a construction technique for the present invention, the Flexure Spacers 15, provide an opportunity to change performance. Again, the Flexure Spacers 15 want to be both stiff and low mass, with the same arguments as for the Mounting Arm 14. In this case an excellent choice for a Flexure Spacer is a nylon spacer swaged between a Flexure 12 and the Mounting Arm 14 with a hollow metal eyelet. This provides high rigidity and strength, low mass and low cost.

In one embodiment of the invention, the design for the present invention, a relatively efficient and low moment of inertia moving coil motor was chosen. The motor is composed of a Moving Coil 17 attached to the Mounting Arm 14, a fixed permanent Magnet 18, and a fixed Back-iron Assembly 16. The Moving Coil 17 is a preformed coil, of fine magnet wire, glued to the Arm with Epoxy, and centered on the rotational axis for highest efficiency and lowest moment of inertia. In this embodiment the coil is moving, so the coil leads need to be routed from the rotating assembly to the fixed part of the device and ultimately to motor drive electronics.

In one embodiment of the invention, a moving magnet design could have a lower moment of inertia, however, an efficient moving magnet design requires a fixed back-iron surrounding the moving magnet. The strong attraction of the magnet to the back-iron may present an issue with a flexure suspended system.

In one embodiment of a construction technique for the present invention, the chosen Flexure 12 material was hardened stainless steel. Higher strength, more exotic materials are available but with only marginally better strength but with significantly higher material and fabrication costs. The more affordable material choice was made taking advantage of the greatly improved Performance Metric of the current invention.

In one embodiment of the design for the present invention, since the chosen Flexure 12 material is stainless steel, which is electrically conductive, two of the Flexures could be used to couple the moving coil leads from the rotating assembly to the fixed part of the device. The conduction path for each of the two moving coil leads is then, separately, from a moving coil end, soldered to an electrical trace on the Arm, to and through a Spacer eyelet, to and through a Flexure, and to the Base where the Flexure is mounted with an electrically Insulated Coupling 20 to the Base with a Screw 21. At the Screw, a wire can be conveniently attached to route the conductor to the motor drive electronics.

In one embodiment of both a design and a construction technique for the present invention, the Base 10 can be fabricated from an insulating material like FR4. This technique would be practical particularly for small Resonant Scanners where the Base could be formed from FR4 and still practically keep a high thickness to length ratio required to make the base appropriately rigid. This technique would simplify the electrical coupling from the Flexure to the Base since the Base substrate material would be nonconductive thereby eliminating the need for an Insulated Coupling. Further, such a base made of FR4 could be a PCB with conductive traces printed on the Base at the points of flexure couplings to act as the coil conductors to the motor drive electronics, thereby possibly eliminating wires. Further still, conceivably, the circuit for the motor drive electronics, or other control or processing electronics, could be printed and installed on the PCB Base.

In one embodiment of the design for the present invention, a mirror Position Sensor 19 can be added. Appropriately, it would look at the bottom center of the attached mirror and accurately report its angular position. Precise and accurate mirror position information is necessary for some high technology applications and improves the ability of the motor drive electronics to control the resonant frequency and/or amplitude of deflection (i.e. angle of deflection).

In one embodiment of the design for the present invention, the motor or other driving means could, for example, take the form of a moving magnet, a moving coil, or a bulk effect device like piezoelectric or magnetostrictive.

In one embodiment of the design for the present invention, the motor could be located predominately under the moving mirror, or intertwined in the crossed flexures, to minimize the total length of the device.

In one embodiment of the design for the present invention, the motor could be located outside of the flexures such that the mirror is not adjacent to the motor.

In one embodiment of the design for the present invention, the flexure material could be non-metallic, for example, plastic, graphite, ceramic, glass, or a composite.

The embodiment of FIG. 1 shows the ends of the flexures bent at 45° to facilitate mounting. Other bend angles, on either end of each flexure, could be used as appropriate for alternative mounting schemes. For example, the arm end of the flexure could be bent into a vertical orientation, rather than horizontal as in FIG. 1, to better mount to an alternative arm design.

Figure 2:
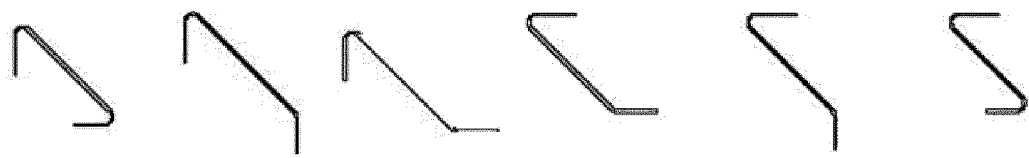
FIG. 2 illustrates various embodiment of the invention showing alternative flexure bends.

FIG. 2 shows generally at 200 various alternative flexure bends as viewed from an end view, for example, the End view of FIG. 1. Only a single flexure is shown. In practice a mirror image (about the vertical axis) flexure would also be used, so that the two flexures would cross (for example, as shown in FIG. 1 at 12') at approximately 90°.

In one embodiment of the design for the present invention, the flexures could contain openings, for example, slots or holes, to modify their stiffness beyond what is determined by their simple outline dimensions.

In one embodiment of the design for the present invention, the flexures could be rigidly attached to the base and arm by means other than screws, for example, riveting, welding, soldering, gluing, etc.

In one embodiment of the design for the present invention, the flexures, or flexure pairs, could be formed monolithically thereby minimizing attachments and flexure misalignments.

In one embodiment of the design for the present invention, the flexures, or flexure pairs, could be formed in the split-band configuration in an attempt to further increase flexure symmetry.

In one embodiment of the design for the present invention, the arm could be a single molded piece incorporating all required functions between the mirror and the flexures (for example, the spacers). For example, it could be bent up to attach to the flexure then flattened to mount the motor then dip to support the mirror at the exact center of rotation.

Figure 3:
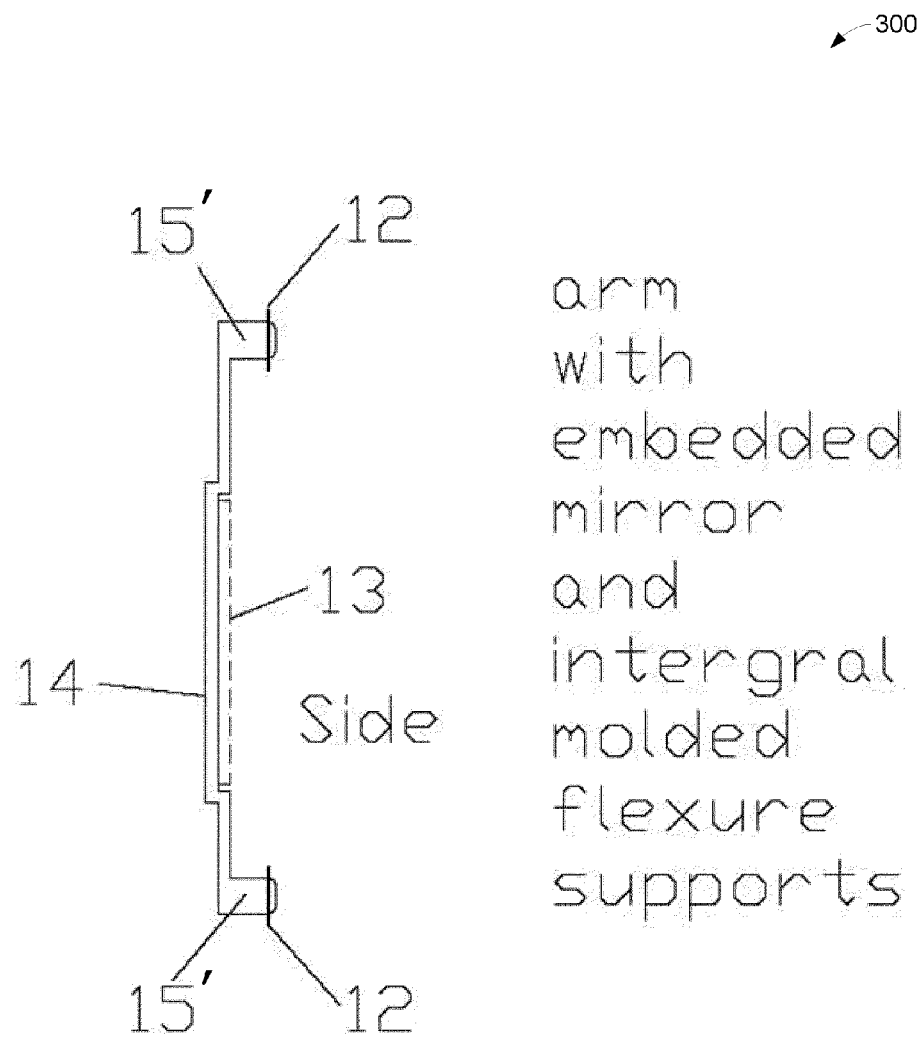
FIG. 3 illustrates one embodiment of the invention showing an arm with embedded mirror.

FIG. 3, illustrates, generally at 300, an arm 14 with an embedded mirror 13 and integral flexure supports 15' which perform the same function as spacers (e.g. 15). At 12 are where the flexures are attached. As may be seen the arm 14 has an indentation where mirror 13 is mounted. In this way the arm 14 supports the mirror 13 at the exact center of rotation.

Figure 4:
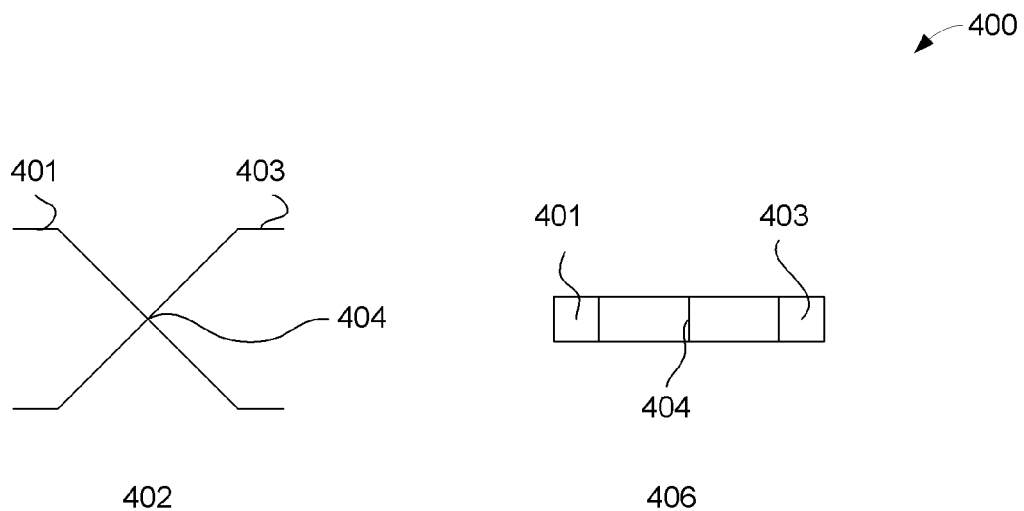
FIG. 4 illustrates various embodiments of the invention.

FIG. 4, illustrates, generally at 400, various embodiments of the present invention. At 402 are shown flexures where at the crossing 404 they are fixedly attached to each other. Since the rotational axis is at the point indicated by 404, the flexures may be fixedly attached at this point. Alternatively, 402 may be constructed of an integral part. At 406 is a top view of such a single flexure unit showing the crossing 404 and the top mounting points on the flexure 401 and 403.

Figure 5:
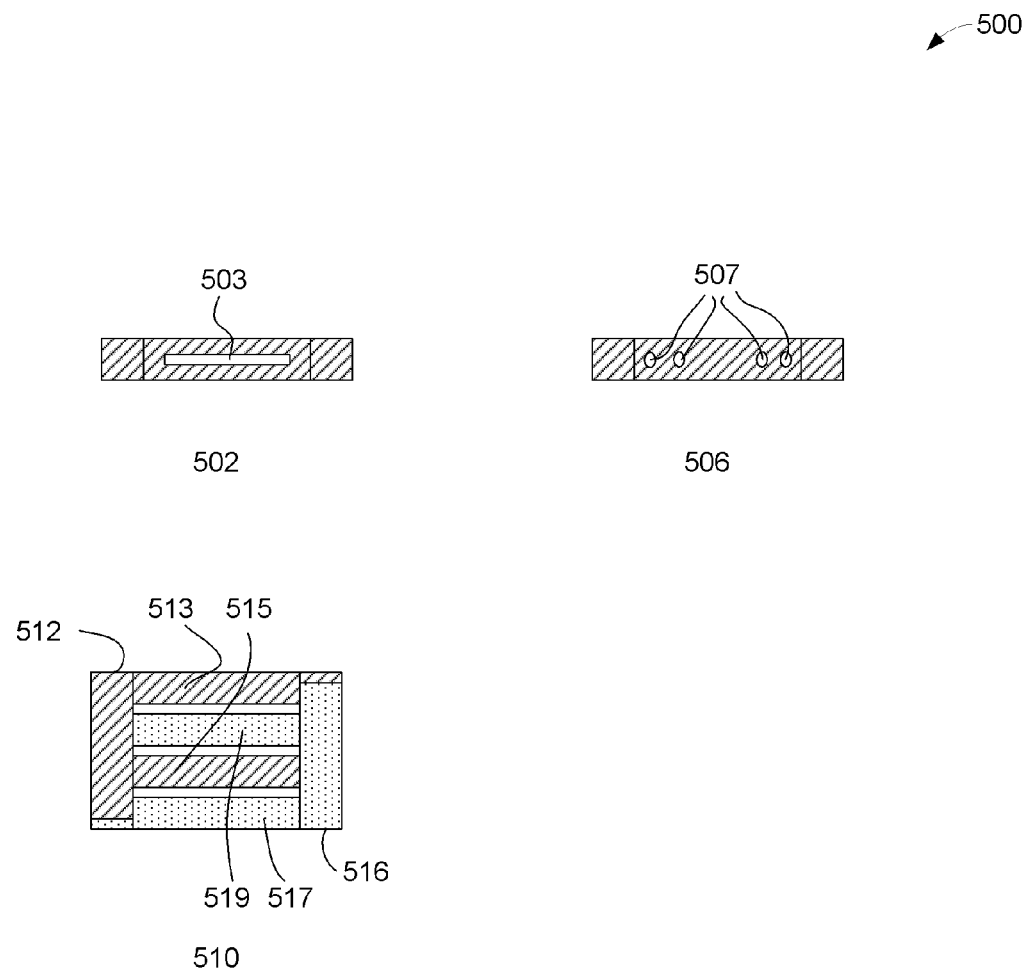
FIG. 5 illustrates various embodiments of the invention.

FIG. 5, illustrates, generally at 500, various embodiments of the present invention. At 502 is shown a top view of a flexure having a slot 503. At 506 is shown a top view of a flexure having holes 507. Note that the holes may be placed at various locations (not shown in FIG. 5 at 506) At 510 is an embodiment showing a top view where the flexures 512 and 516 are "multi-fingered" (two "fingers" at 513 and 515 for flexure 512; two "fingers" at 517 and 519 for flexure 516) and the "fingers" are intertwined.

Figure 6:
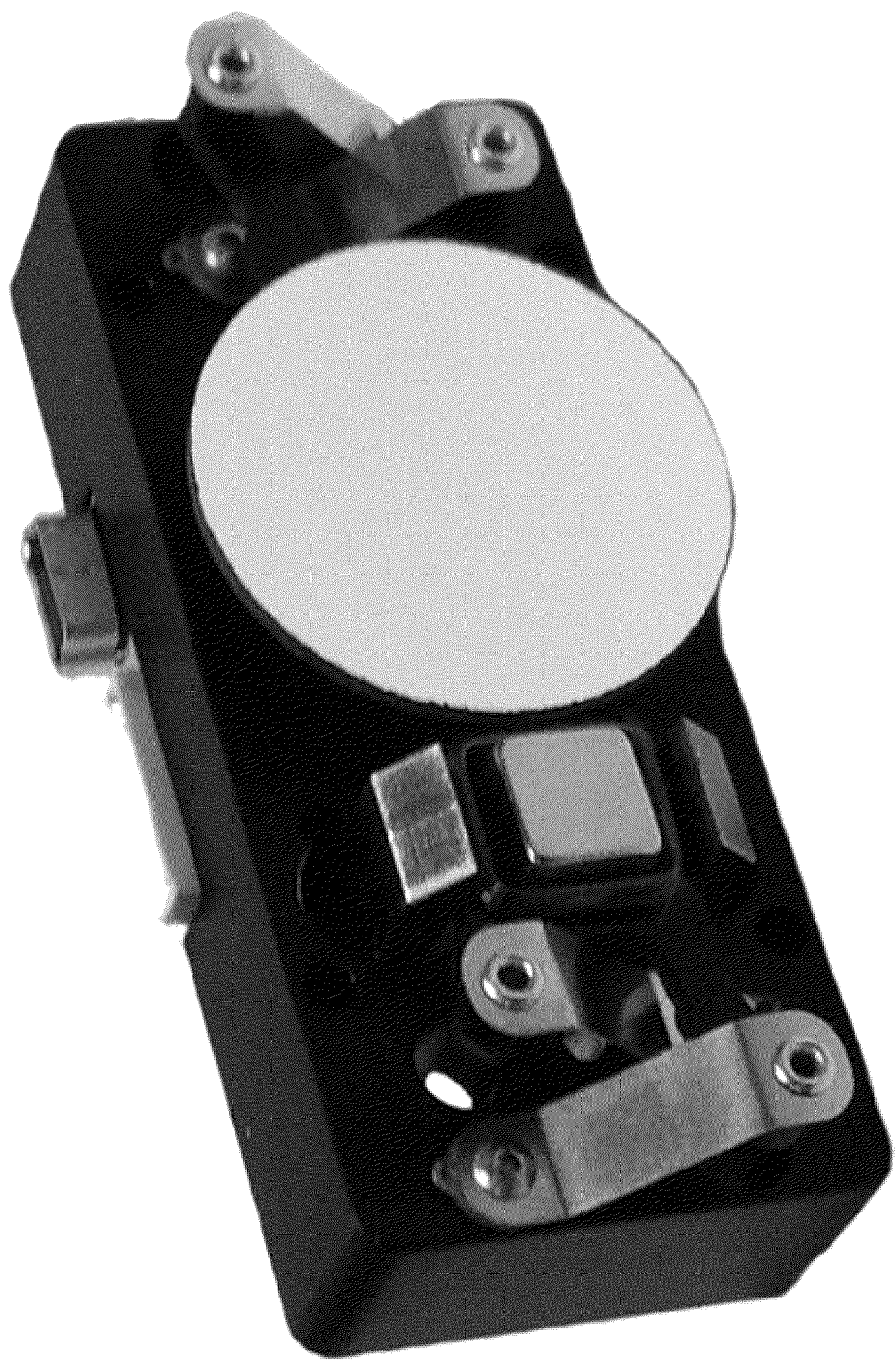
FIG. 6 illustrates an embodiment of the present invention.

FIG. 6, illustrates an embodiment of the present invention.

Figure 7:
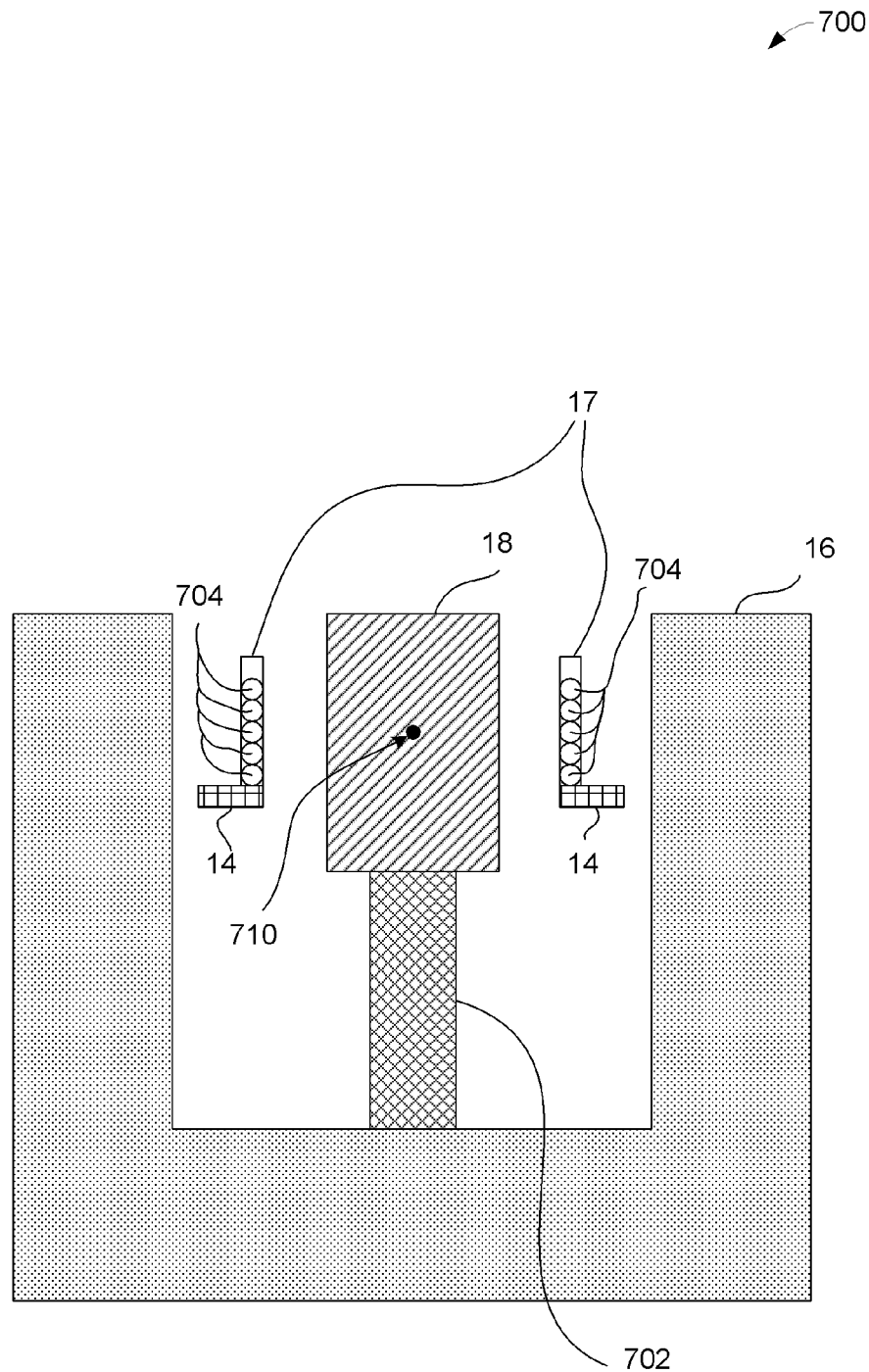
FIG. 7 illustrates an embodiment of the invention showing a cross sectional view.

FIG. 7, illustrates, generally at 700, one embodiment of the invention showing a cross sectional view of an expanded not to scale view of a moving coil 17 mounted on the moving arm 14, and a back iron assembly 16 and a magnet 18. At 702 is a support (non-magnetic) for attaching the magnet 18 to the back iron assembly 16. At 704 are coils of wire of the moving coil 17 for explanation purposes. At 14 is the moving arm on which the moving coil 17 is mounted. Note that the drawing is not to scale. When there is no current flowing through the coils of wire 704 of the moving coil 17 the moving coil 17 which is attached to the moving arm 14 is at rest as shown in FIG. 7. When current flows in a first direction through the coils of wire 704 of the moving coil 17 the moving coil 17 this will produce a magnetic field which will interact with the magnet 18 and create a torque that will cause the moving coil 17 to rotate and since it is attached to the moving arm 14 will cause the moving arm to rotate, for example clockwise as viewed from the page of FIG. 7. When current is removed the restorative forces of the flexures will tend to return the moving arm 14 (and the attached moving coil 17) to its at rest position as shown in FIG. 7. Likewise when a current flows in a direction opposite to the first direction current flow, the moving coil 17 and moving arm 14 will rotated in a counter-clockwise direction. What is to be appreciated by one of skill in the art is that using for example, the right hand rule it can be easily seen that torque about the rotational axis of the moving arm 14 may be produced by the moving coil 17.

In one embodiment of the invention, for example as illustrated in FIG. 7 the torque created by the moving coil motor (or not shown a moving magnet motor) is symmetrical about the rotational axis of the rotating assembly (which has components such as, but not limited, to the moving coil, the mirror, the moving arm, etc.). For example, in FIG. 7 at point 710 is denoted the rotational axis of the rotating assembly.

In one embodiment of the invention, for example as illustrated in FIG. 7 the center of the mass of the rotating assembly (which has components such as, but not limited, to the moving coil, the mirror, etc. mounted on it) is at the center of rotation of the rotating assembly, for example, as illustrated in FIG. 7 at point 710 a dot.

In one embodiment of the invention, for example as illustrated in FIG. 7 the torque created by the moving coil motor (or not shown a moving magnet motor) is symmetrical about the rotational axis of the rotating assembly (which has components such as, but not limited, to the moving coil, the mirror, the moving arm, etc.). For example, in FIG. 7 at point 710 is denoted the rotational axis of the rotating assembly and the center of the mass of the rotating assembly (which has components such as, but not limited, to the moving coil, the mirror, the moving arm, etc.) is at the center of rotation of the rotating assembly, for example, as illustrated in FIG. 7 at point 710. Thus in this embodiment we have the center of mass at the center of rotation (the rotational axis) and we have symmetrical torque about the rotational axis. This results in fewer forces that might lead to "wobble" of the rotating assembly.

Figure 8:
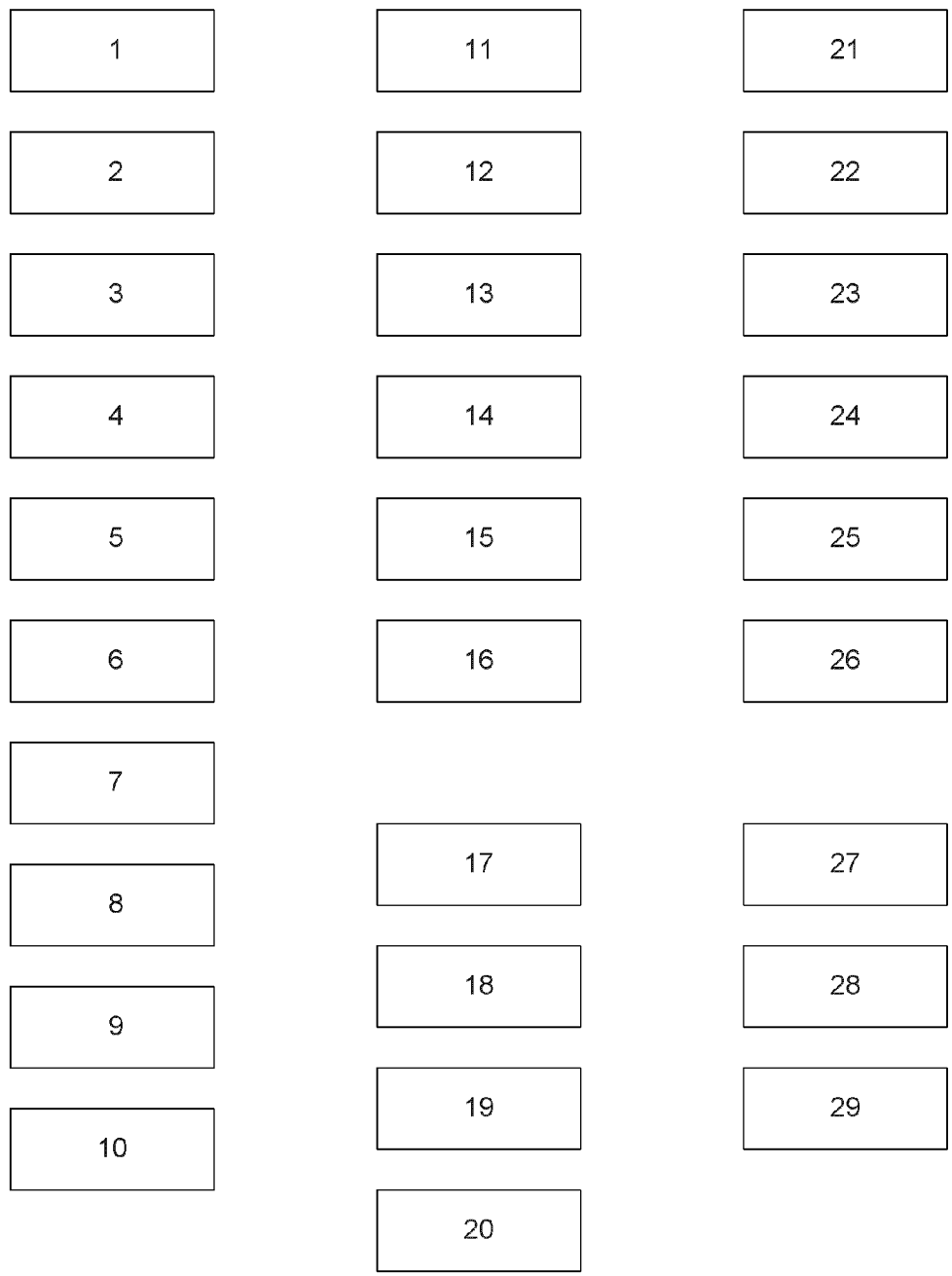
FIG. 8 illustrates various embodiments of the invention.

FIG. 8 illustrates various embodiments of the present invention.

At 1. A resonant rotational oscillator having a moving coil mounted on a moving member.

At 2. The resonant rotational oscillator of claim 1 wherein said moving coil is mounted proximate to a mirror mounted on said moving member.

At 3. The resonant rotational oscillator of claim 1 wherein said moving coil is a plurality of moving coils.

At 4. The resonant rotational oscillator of claim 1 wherein said moving coil is powered by conductive means mounted on said moving member.

At 5. The resonant rotational oscillator of claim 4 wherein said conductive means are printed circuit board traces on said moving member.

At 6. The resonant rotational oscillator of claim 1 wherein said conductive means are electrically connected to two or more flexures.

At 7. The resonant rotational oscillator of claim 2 wherein said moving coil is a shape as viewed normal to said moving member said shape selected from the group consisting of rounded rectangular, rectangular, circular, and elliptical.

At 8. The resonant rotational oscillator of claim 1 wherein said moving coil has an opening through which a magnetic piece protrudes.

At 9. The resonant rotational oscillator of claim 8 wherein said magnetic piece is a permanent magnet.

At 10. The resonant rotational oscillator of claim 1 wherein said magnetic piece is magnetically coupled to a back iron assembly, said back iron assembly having one or more pole pieces to concentrate a magnetic flux through said moving coil.

At 11. A resonant rotational oscillator comprising:
a plurality of bending flexures;
a moving member fixedly attached to two or more of said plurality of bending flexures;
and wherein said resonant rotational oscillator has a performance metric (PM) of greater than 12500 HzDegrees where PM is defined by a equation:

$$PM = \text{frequency} * \text{angle}$$

where:
frequency=hertz (Hz) of operation of said resonant rotational oscillator; and
angle=degrees of angle deflection (maximum) of said moving member when operating at said frequency.

At 12. The resonant rotational oscillator of claim 11 further comprising a moving coil mounted on said moving member.

At 13. The resonant rotational oscillator of claim 12 wherein said plurality of bending flexures is four bending flexures.

At 14. The resonant rotational oscillator of claim 12 wherein two of said plurality of bending flexures are proximate to each other and cross at substantially right angles when viewed along a longitudinal axis of said moving member.

At 15. The resonant rotational oscillator of claim 14 further comprising a magnetic means for producing a magnetic field across said moving coil.

At 16. The resonant rotational oscillator of claim 15 wherein said magnetic means further comprises a permanent magnet.

At 17. An apparatus comprising:
a rigid base having one or more mounting points;
a plurality of flexing members each of said plurality of flexing members having a first end and a second end wherein each of said plurality of flexing member's first end is attached to one or more of said one or more mounting points on said rigid base;
a moving member having a plurality of mounting points;
a plurality of spacing members each of said spacing members having a first end and a second end wherein each of said plurality of spacing member's first end is attached to one or more of said plurality of mounting points on said moving member; and wherein each of said plurality of spacing member's second end is attached to one or more of said plurality of flexing members second end.

18. The apparatus of claim 17 wherein said plurality of flexing members is four flexing members.

19. The apparatus of claim 17 wherein said spacing members are an integral part of said plurality of flexing members.

20. The apparatus of claim 17 wherein said rigid base, and said plurality of flexing members, and said moving member, and said plurality of spacing members are all formed as one integral unit.

21. A resonant rotational oscillator having a moving entity on a rotating assembly wherein said rotating assembly's center of mass is at said rotating assembly's center of rotation.

22. The resonant rotational oscillator of claim 21 wherein said moving entity applies a symmetrical torque about said rotating assembly's rotational axis.

23. The resonant rotational oscillator of claim 21 wherein said moving entity is a moving coil.

24. The resonant rotational oscillator of claim 21 wherein said moving entity is a moving magnet.

25. The resonant rotational oscillator of claim 22 wherein said moving entity is a moving coil.

26. The resonant rotational oscillator of claim 22 wherein said moving entity is a moving magnet.

27. A method for producing a resonant rotational oscillator having its rotating assembly center of mass at its center of rotation, the method comprising:

attaching a first end of each of a plurality of flexures to a rigid base;

attaching a second end of each of said plurality of flexures each to a first end of a plurality of spacers;

attaching a second end of each of said plurality of spacers each to a moving arm wherein said moving arm is a part of said rotating assembly; and mounting on said moving arm a moving entity.

28. The method of claim 27 wherein said moving entity is selected from the group consisting of a moving coil, and a moving magnet.

29. The method of claim 28 further comprising wherein said moving entity produces symmetrical torque about said rotating assembly's rotational axis.

In one embodiment of the design for the present invention, the arm could be made of an alternative material, for example aluminum, a plastic, graphite, ceramic, glass, or a composite.

In one embodiment of the design for the present invention, the arm could be shaped in other variations. The arm could be shaped differently to accommodate different orientations of the motor, mirror, flexures, and motion sensor. The section of the arm that supports the mirror could be shaped differently to optimize support in various applications, for example wider or with a cross bar.

In one embodiment of the design for the present invention, the arm could be contoured to allow the mirror to be embedded in the arm to further minimize the moment of inertia. Such a contour might appear in profile as a "U" shaped indentation in the arm. Alternatively, the mirror could be made integral to the arm by applying the appropriate coating directly to arm.

In one embodiment of the invention the center of mass (of the moving assembly, also called the rotating assembly) is at the center of rotation (of the moving assembly). In one embodiment of the invention symmetrical torque about the rotational axis is applied (e.g. by a motor). In one embodiment of the invention for the moving assembly the center of mass is at the center of rotation and there is symmetrical torque about the rotational axis.

In one embodiment of the design for the present invention, for different applications, the mirror could be replaced with a grating, prism, lens, filter or other optical device. Non-optical applications for the present invention are also conceivable, including applications as diverse as tissue stimulation and mechanical separation devices.

Thus, the above examples and embodiments should not be deemed to be the only embodiments, and are presented to illustrate the flexibility and advantages of the present invention as disclosed. For example there are other means of attaching the flexures to the arm and to the base, for example welding, soldering, gluing or riveting. Rather than a flat arm and attaching flexure spacers, the arm may be formed of a single material to mechanically incorporate both and thereby decrease the total mass and possibly reduce manufacturing processes. Other types of motors and motion sensors could be used. The present invention, as one embodiment, was actually designed with the drive electronics incorporated into the base.

In the embodiments discussed and disclosed above, a moving coil was used to illustrate various embodiments, however, the invention is not so limited. In other embodiments a moving magnet may be used rather than a moving coil. Thus a moving magnet motor may be used rather than a moving coil motor. One of skill in the art will understand that where a moving magnet is used a coil may be used to cause the moving magnet to rotate.

Thus a method and apparatus for resonant rotational oscillator have been described.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate non-transitory physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a specialized computer system in which the techniques of the present invention may be practiced as well as implemented as an embodiment).

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

As used in this description, "substantially" or "substantially equal" or similar phrases are used to indicate that the items are very close or similar. Since two physical entities can never be exactly equal, a phrase such as "substantially equal" is used to indicate that they are for all practical purposes equal.

It is to be understood that in any one or more embodiments of the invention where alternative approaches or techniques are discussed that any and all such combinations as may be possible are hereby disclosed. For example, if there are five techniques discussed that are all possible, then denoting each technique as follows: A, B, C, D, E, each technique may be either present or not present with every other technique, thus yielding 2^5 or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given any combination.

Thus a method and apparatus for resonant rotational oscillator have been described.

What is claimed is:

1. A resonant rotational oscillator having a moving coil mounted on a moving member, said moving member having four or more terminating ends, said terminating ends attached to four or more flat flexures, pairs of said flat flexures arranged to cross substantially at right angles when viewed along a longitudinal axis of said moving member, wherein said resonant rotational oscillator has a performance metric (PM) of greater than 12500 HzDegrees where PM is defined by an equation:

$$PM = frequency * angle$$

where:
frequency=hertz (Hz) of operation of said resonant rotational oscillator; and
angle=degrees of angle deflection (maximum) of said moving member when operating at said frequency.

2. The resonant rotational oscillator of claim 1 further comprising a moving coil mounted on said moving member.

3. The resonant rotational oscillator of claim 2 wherein said four or more flat flexures is four flat flexures.

4. The resonant rotational oscillator of claim 3 further comprising a magnetic means for producing a magnetic field across said moving coil.

5. The resonant rotational oscillator of claim 4 wherein said magnetic means further comprises a permanent magnet.

6. The resonant rotational oscillator of claim 2 wherein two of said plurality of bending flexures are proximate to each other and cross at substantially right angles when viewed along a longitudinal axis of said moving member.

* * * * *